UNITED STATES PATENT OFFICE.

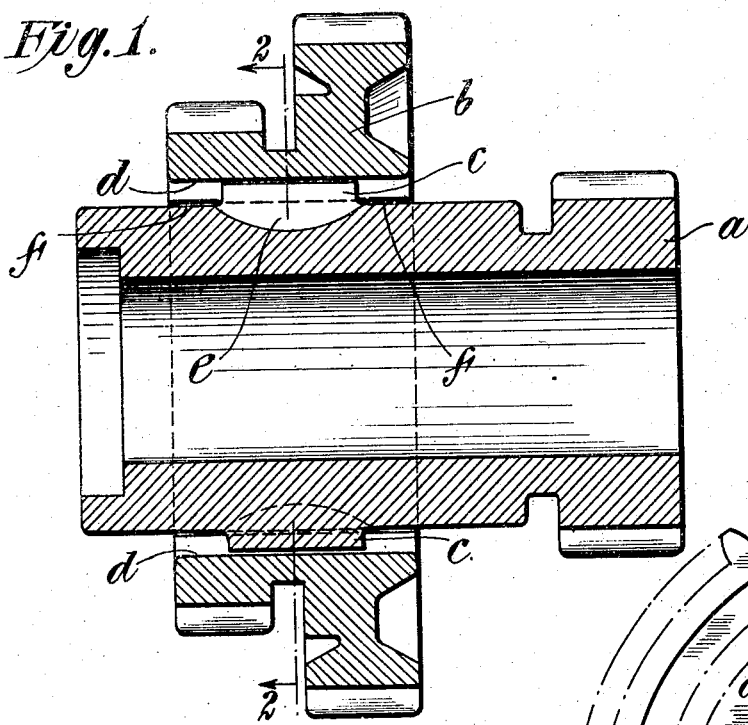
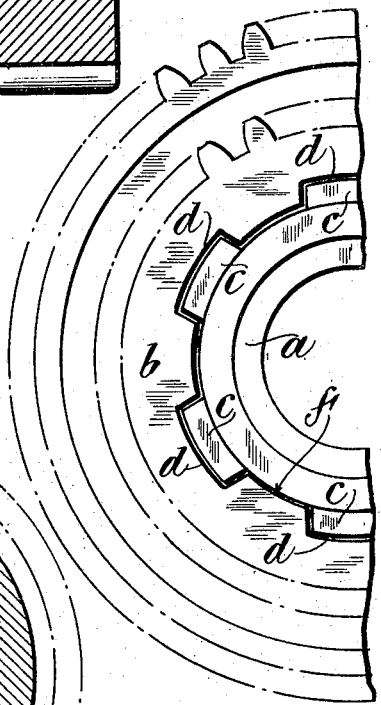
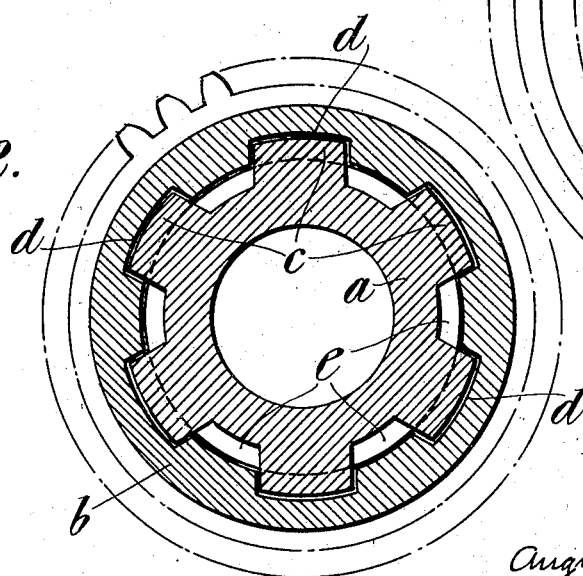

AUGUST H. LEIPERT, OF BROOKLYN, AND ALEXANDER GRISWOLD HERRESHOFF, OF NEW YORK, N. Y., ASSIGNORS TO INTERNATIONAL MOTOR COMPANY, OF NEW YORK, N. Y., A CORPORATION OF DELAWARE.

GEARING.

1,342,175.     Specification of Letters Patent.     Patented June 1, 1920.

Application filed May 9, 1918. Serial No. 233,435.

*To all whom it may concern:*

Be it known that we, AUGUST H. LEIPERT and ALEXANDER G. HERRESHOFF, both citizens of the United States, and residents, respectively, of the borough of Brooklyn of the city of New York and of the borough of Manhattan of the city of New York, in the State of New York, have invented certain new and useful Improvements in Gearing, of which the following is a specification, reference being had to the accompanying drawing, forming a part hereof.

This invention relates to a gearing in which a gear or its equivalent for the purposes of this invention, such as a clutch member, for example, is mounted on a shaft or its equivalent so as to be free to be moved longitudinally thereon while rotating therewith, the engagement of the two parts for rotation being effected by a spline or splines on the shaft in coöperation with the corresponding internal members of the gear. It is desirable that the spline-gear and the spline-shaft shall have a truly cylindrical bearing, one upon the other and also that the bearing surfaces of each shall be hardened. It is a fact, however, that no matter how accurately the bearing surfaces may have been formed before hardening, the process of hardening causes more or less distortion of the bearing surfaces and that, with the ordinary construction of spline-gearing, it is impossible to grind the bearing surfaces after hardening so as to produce a truly cylindrical surface. It is the object of this invention to improve the construction of spline-gearing so as to make it possible to secure truly cylindrical, ground bearing surfaces for the members of the gearing. The invention will be more fully explained hereinafter with reference to the accompanying drawing in which it is illustrated and in which—

Figure 1 is a view in longitudinal section of a gearing constructed in accordance with the invention.

Fig. 2 is a view in transverse section on the plane indicated by the broken line 2—2 of Fig. 1, looking in the direction of the arrows.

Fig. 3 is a view in end elevation as seen from the right hand in Fig. 1.

The gearing, which has been chosen for illustration of the invention, is such a gearing as might be employed as a part of the transmission of a motor vehicle, the spline-shaft $a$ being a hollow shaft or sleeve and the spline-gear $b$ being a double gear. Obviously, however, it is immaterial, so far as the present invention is concerned, what particular form the spline-shaft and the spline-gear may have. In the construction shown the spline-shaft has a plurality of splines $c$, for coöperation with corresponding grooves $d$ of the gear $b$, but the invention is equally applicable to a gearing in which one of the members has but one spline for coöperation with a single longitudinal groove of the other member. In the improved gearing each spline $c$ is of such length that the gear shall remain in engagement therewith as it slides on the shaft, but it is shorter than the gear, so that when the gear is centrally placed it shall have a bearing, as hereinafter described, on the shaft at each end of the spline or splines. The spline-shaft may be formed in the usual way by machining an integral cylinder of metal and at each side of each spline the shaft is milled out longitudinally, as at $e$, so that the diameter of the shaft, between the splines, is less than the diameter of the shaft at the bearing surfaces, the purpose of such milling out being to prevent any possible interference between the shaft and the gear in the longitudinal movements of the latter. When the shaft has been formed, as described, and has been hardened, the bearing surfaces $f$, at each end of the spline or splines, are ground truly cylindrical for such a distance as may be required by the longitudinal movement of the gear. The spline or splines $c$ are, of course, also ground to give true surfaces.

The gear $b$ is formed in the usual manner, the external teeth and the internal grooves being cut as usual. When the gear has been formed and hardened it is ground interiorly to a truly cylindrical surface of the proper diameter, being supported by pins on its pitch line while it is being ground with an internal grinder in the usual manner. This grinding is done, of course, on the inner faces of the longitudinal portions between the grooves $d$. Whatever may be the longitudinal position of the gear on the shaft, this truly cylindrical, ground surface co-acts with the truly cylindrical, ground surface of the spline-shaft and constitutes a truly cylindrical bearing at one end or the other or at each end of the spline or splines of the shaft.

It will be understood, of course, that in the drawing the clearance between the ground surfaces of the shaft and the gear is greatly exaggerated and that the actual clearance is very small.

It will also be understood that the particular form of gearing to which the invention is applied is not material and that the invention may be embodied in many other forms of gearing than that indicated.

We claim as our invention:

1. A spline-gearing comprising a spline-shaft and a spline-gear in constant driving engagement therewith, the shaft having a spline shorter than the length of the gear and located between the ends thereof and having its diameter at each side of the spline reduced, and having also its surface at the end of the spline ground to a truly cylindrical form, and the gear having its internal surface ground to a truly cylindrical form to fit properly on the cylindrically ground surface of the shaft beyond the ends of the spline.

2. A spline-gearing comprising a spline-shaft and a spline-gear in constant driving engagement therewith, the shaft having a plurality of integral splines shorter than the length of the gear and located between the ends thereof and having the portions between the splines reduced in diameter and having also its surface at the ends of the splines ground to a truly cylindrical form and the gear grooved longitudinally to engage the splines and having its internal surface ground cylindrically to fit properly the ground surface of the shaft beyond the ends of the spline.

This specification signed this 8th day of May, A. D. 1918.

AUGUST H. LEIPERT.
ALEXANDER GRISWOLD HERRESHOFF.